US012049019B2

(12) United States Patent
Schwamberger et al.

(10) Patent No.: US 12,049,019 B2
(45) Date of Patent: Jul. 30, 2024

(54) METHOD AND APPARATUS FOR ADJUSTING AND MAINTAINING A POSITION OF A CUTTING SURFACE OF A PERFORATING APPARATUS

(71) Applicant: The Procter & Gamble Company, Cincinnati, OH (US)

(72) Inventors: Brian Christopher Schwamberger, Fairfield Township, OH (US); Gustav André Mellin, Amberly Village, OH (US); Michael Devin Long, Springfield Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 343 days.

(21) Appl. No.: 17/095,787

(22) Filed: Nov. 12, 2020

(65) Prior Publication Data

US 2021/0060809 A1 Mar. 4, 2021

Related U.S. Application Data

(63) Continuation of application No. 16/156,023, filed on Oct. 10, 2018, now Pat. No. 10,857,690.

(Continued)

(51) Int. Cl.
*B26D 7/26* (2006.01)
*B26D 3/08* (2006.01)
(Continued)

(52) U.S. Cl.
CPC ............. *B26D 7/265* (2013.01); *B26D 3/085* (2013.01); *B26D 7/204* (2013.01); *B26F 1/20* (2013.01)

(58) Field of Classification Search
CPC .......... B26D 7/26; B26D 7/204; B26D 7/265; B26D 2007/202; B26D 2007/2614–2642; B26F 1/20
(Continued)

(56) References Cited

U.S. PATENT DOCUMENTS 1,462,138 A * 7/1923 Langston ............... B23D 15/06 83/112
2,711,935 A * 6/1955 William .................. F16C 23/10 116/230

(Continued)

OTHER PUBLICATIONS

All Office Actions, U.S. Appl. No. 16/156,023.

*Primary Examiner* — Richard D Crosby, Jr.
(74) *Attorney, Agent, or Firm* — Richard L. Alexander; Charles R. Matson

(57) ABSTRACT

The present disclosure relates to adjusting and maintaining a position of a cutting surface used to create lines of weakness for rolled products. A perforating apparatus includes a housing rotatably supported by a frame, wherein the housing is adapted to rotate about a first axis. A support member including a first cutting surface is rotatably supported by the housing, wherein the support member is adapted to rotate about a second axis offset from the first axis. A roll including a second cutting surface is positioned adjacent the support member, wherein the roll is adapted to rotate about a third axis. The second cutting surface is adapted to contact the first cutting surface as the roll rotates about the third axis. The perforating apparatus is configured such that the functions of adjusting the position of the first cutting surface and holding the first cutting surface in a fixed position are separate.

20 Claims, 11 Drawing Sheets

Related U.S. Application Data

(60) Provisional application No. 62/729,441, filed on Sep. 11, 2018.

(51) Int. Cl.
*B26D 7/20* (2006.01)
*B26F 1/20* (2006.01)

(58) Field of Classification Search
USPC .............................................................. 83/344
See application file for complete search history.

(56) References Cited

U.S. PATENT DOCUMENTS 3,693,682 A * 9/1972 Hasfjord .................... B27C 1/14 33/628
4,308,776 A * 1/1982 Gillespie .............. B26D 7/2628 83/346
4,332,582 A * 6/1982 Hertrich ............... B65H 45/168 493/432
4,413,541 A 11/1983 Biggar, III
4,527,473 A 7/1985 Littleton
5,001,950 A 3/1991 Fokos et al.
5,022,295 A * 6/1991 Stemmler ................ B26D 7/10 83/72
5,083,488 A * 1/1992 Stanley ................ B26D 7/2628 100/168
5,087,237 A * 2/1992 Nunley ................ B26D 7/1836 493/373
5,127,295 A * 7/1992 Hax ..................... B26D 7/2635 83/508.3
5,174,182 A 12/1992 Rosenthal et al.
5,190,768 A 3/1993 Ishida et al.
5,297,464 A 3/1994 Mayer
5,311,800 A 5/1994 Focke et al.
5,378,221 A 1/1995 Lauderbaugh et al.
5,388,490 A 2/1995 Buck
5,419,224 A 5/1995 Gamperling et al.
5,598,758 A 2/1997 Chmelar
5,673,603 A 10/1997 Aichele
5,720,210 A 2/1998 Okahashi
5,778,782 A 7/1998 Behringer et al.
5,806,418 A 9/1998 Dillinger
5,857,396 A 1/1999 Strouse, Jr.
6,105,479 A 8/2000 Neier et al.
6,244,148 B1 6/2001 Vees
6,308,605 B1 10/2001 Rau et al.
6,370,998 B1 * 4/2002 Yokoro ................ B23D 35/005 83/698.61
6,673,005 B2 * 1/2004 Blanchard .............. B65H 29/52 493/460
6,689,037 B2 2/2004 Waldeck et al.
8,333,312 B2 * 12/2012 Dickner .................. B65B 61/06 83/13
10,857,690 B2 12/2020 Schwamberger et al.
2002/0029675 A1 * 3/2002 Aichele ................ B26D 7/2614 76/115
2006/0257193 A1 * 11/2006 Aichele .................. B26D 7/265 400/621
2008/0115641 A1 * 5/2008 Freyburger .............. B26D 3/10 83/425.2
2008/0264222 A1 * 10/2008 Dobrescu ............... D05B 27/14 83/437.1
2012/0055305 A1 * 3/2012 Betti ...................... B26D 1/626 83/436.3
2012/0079926 A1 * 4/2012 Long ........................ B26D 7/18 83/346
2012/0234145 A1 * 9/2012 Kandemir .............. B26D 7/265 83/56
2012/0325063 A1 * 12/2012 Paunesku ................ B65B 61/28 83/13
2013/0000457 A1 * 1/2013 Oba ..................... B26D 7/2628 83/344
2014/0069248 A1 3/2014 Wang
2014/0366695 A1 12/2014 Kien et al.
2014/0366702 A1 12/2014 Kien et al.
2014/0370224 A1 12/2014 Kien et al.
2015/0033920 A1 * 2/2015 Bayzelon ............. B26D 7/2614 83/13
2016/0008998 A1 1/2016 Dénisse et al.
2016/0016324 A1 * 1/2016 Bapst ...................... B26F 1/384 29/401.1
2016/0271820 A1 9/2016 Slovut et al.
2016/0271823 A1 * 9/2016 Slovut ...................... B26D 7/26
2016/0271824 A1 9/2016 Slovut et al.
2016/0279820 A1 * 9/2016 Boutron .................. B31B 50/14
2017/0087737 A1 * 3/2017 Lodi ....................... B26F 1/384
2017/0113365 A1 4/2017 Secondi
2017/0239830 A1 * 8/2017 Adami ................... B26D 7/265
2017/0239832 A1 * 8/2017 Tsuji ...................... B26D 7/265
2018/0021971 A1 * 1/2018 Zagorski ................ B26D 7/265 83/13
2018/0200910 A1 7/2018 Cassoli et al.
2018/0354149 A1 * 12/2018 Dijon ...................... B26F 1/384
2019/0142650 A1 * 5/2019 Long ...................... B26D 1/405 83/13
2019/0224900 A1 * 7/2019 Stapleton ................ B29C 48/92

* cited by examiner

METHOD AND APPARATUS FOR ADJUSTING AND MAINTAINING A POSITION OF A CUTTING SURFACE OF A PERFORATING APPARATUS

CROSS REFERENCE TO RELATED APPLICATIONS

This application is a continuation of, and claims priority under 35 U.S.C. § 120 to, U.S. patent application Ser. No. 16/156,023, filed on Oct. 10, 2018, which is now U.S. Pat. No. 10,857,690, which claims the benefit, under 35 USC § 119(e), of U.S. Provisional Patent Application Ser. No. 62/729,441, filed on Sep. 11, 2018, the entire disclosures of which are fully incorporated by reference herein.

FIELD OF THE INVENTION

The present disclosure relates to methods and apparatuses for forming lines of weakness in rolled products, and more specifically, relates to apparatuses and methods for adjusting and maintaining a position of a cutting surface used to create lines of weakness for rolled products.

BACKGROUND OF THE INVENTION

Some articles and packages may include a strip of material that has a line of weakness having one or more perforations to aid in tearing the article or package. For example, articles may include wax paper, aluminum foil, disposable bags, and sanitary tissue products, such as toilet tissue, facial tissue, and paper towels manufactured in the form of a web. Sanitary tissue products include lines of weakness to permit tearing off discrete sheets, for example, as is well known in the art. Such products are commonly used in households, businesses, restaurants, shops, and the like.

A line of weakness may include a plurality of perforations extending across the width of the web. In some configurations, lines of weakness may be created in a substrate by advancing the substrate between two cutting surfaces. For example, some perforators may utilize a cutting surface in the form of a rotating blade that flexes against a relatively stationary blade or anvil during operation to cut perforations in the substrate. However, creating perforations in substrates having relatively long widths and advancing at relatively high speeds can present various challenges in cutting operations. For example, improper initial positioning and unintended movement of the stationary blade during cutting operations can lead to non-perforated areas and/or inconsistent quality in the perforation and/or additional wear on equipment. Thus, it may be important to have the ability to precisely place and hold cutting surfaces in relatively fixed positions in order to maintain a desired engagement between cutting surfaces during operation.

In an attempt to avoid the above described negative affects resulting from improper initial blade positioning and unintended blade movement during operation, perforators may be configured with an adjustment apparatus that allows a user to adjust the position of a stationary blade relative to a rotating cutting surface. For example, in some configurations, an adjustment apparatus may include an eccentric housing that supports the stationary blade. With such a configuration, the cutting surface of the stationary blade may be moved toward and away from an opposing cutting surface by rotating the eccentric housing. Rotation of the eccentric housing may be accomplished by moving a threaded rod against a tang on the eccentric housing. During the adjustment operation, the threaded rod may act against a spring providing an opposing force on an opposite side of the tang. Once the desired blade position is achieved, the rod can be locked into place. In turn, the spring force holds the tang against the rod to help maintain eccentric housing and blade in a fixed position. Thus, the adjustment mechanism may be configured to provide both functions of blade positioning and holding. However, combining the positioning and holding functions into a single apparatus can lead to problems. For example, precise movement of the blade can be relatively difficult, because movement of the blade requires an operator to overcome opposing forces configured for holding the blade in a fixed position. Conversely, when relatively high forces are applied to the stationary blade during cutting operations, the blade may unintentionally move because of cutting forces overcoming the spring forces.

Consequently, it would be beneficial to provide a method and apparatus for adjusting and holding the position of a stationary cutting surface wherein the functions of the blade position adjustment and holding are separated.

SUMMARY OF THE INVENTION

In one form, a perforating apparatus comprises: a frame; a housing rotatably supported by the frame, the housing adapted to rotate about a first axis; a support member rotatably supported by the housing, the support member adapted to rotate about a second axis, the second axis being offset from the first axis, the support member comprising a first cutting surface; a roll positioned adjacent the support member, the roll adapted to rotate about a third axis, the roll comprising a second cutting surface adapted to intermittently contact the first cutting surface as the roll rotates about the third axis; a holding device selectively operable in a first configuration and a second configuration; wherein in the first configuration, the housing is permitted to rotate about the first axis to selectively move the first cutting surface toward and away from the roll; and wherein in the second configuration, the housing is fixedly connected with the frame to maintain a fixed distance between the first cutting surface and the third axis.

In another form, a method for perforating a substrate comprises: providing a frame; a housing rotatably supported by the frame, the housing adapted to rotate about a first axis; and a support member comprising a first end portion and an opposing second end portion, the first end portion rotatably supported by the housing, the support member adapted to rotate about a second axis, the second axis being offset from the first axis, the support member comprising a first cutting surface; providing a roll positioned adjacent the support member, the roll adapted rotate about a third axis, the roll comprising a second cutting surface adapted to intermittently contact the first cutting surface as the roll rotates about the third axis; providing a holding device selectively operable in a first configuration and a second configuration, the first configuration permitting rotation of the housing about the first axis and the second configuration preventing rotation of the housing about the first axis; placing the holding device in the first configuration and selectively moving the first cutting surface toward or away from the roll by rotating the housing about the first axis; placing the holding device in the second configuration; rotating the roll and second cutting surface about the third axis; advancing a substrate between the first cutting surface and the rotating roll with the holding device in the second configuration; and perforating the substrate to form a line of weakness.

In yet another form, a cutting apparatus comprises: a frame; a housing rotatably supported by the frame, the housing adapted to rotate about a first axis; a support member rotatably supported by the housing, the support member adapted to rotate about a second axis, the second axis being offset from the first axis, the support member comprising a cutting surface comprising a distal edge; a clamp connected with the frame, the clamp selectively operable in a first configuration and a second configuration; wherein in the first configuration, the clamp is disengaged from the housing such that the distal edge of the cutting surface is selectively movable toward or away from the first axis by rotating the housing about the first axis; and wherein in the second configuration, the clamp is engaged with the housing to fixedly connect the housing with the frame to maintain a fixed distance between the distal edge of the cutting surface and the first axis.

DETAILED DESCRIPTION OF THE INVENTION

Figure 1:
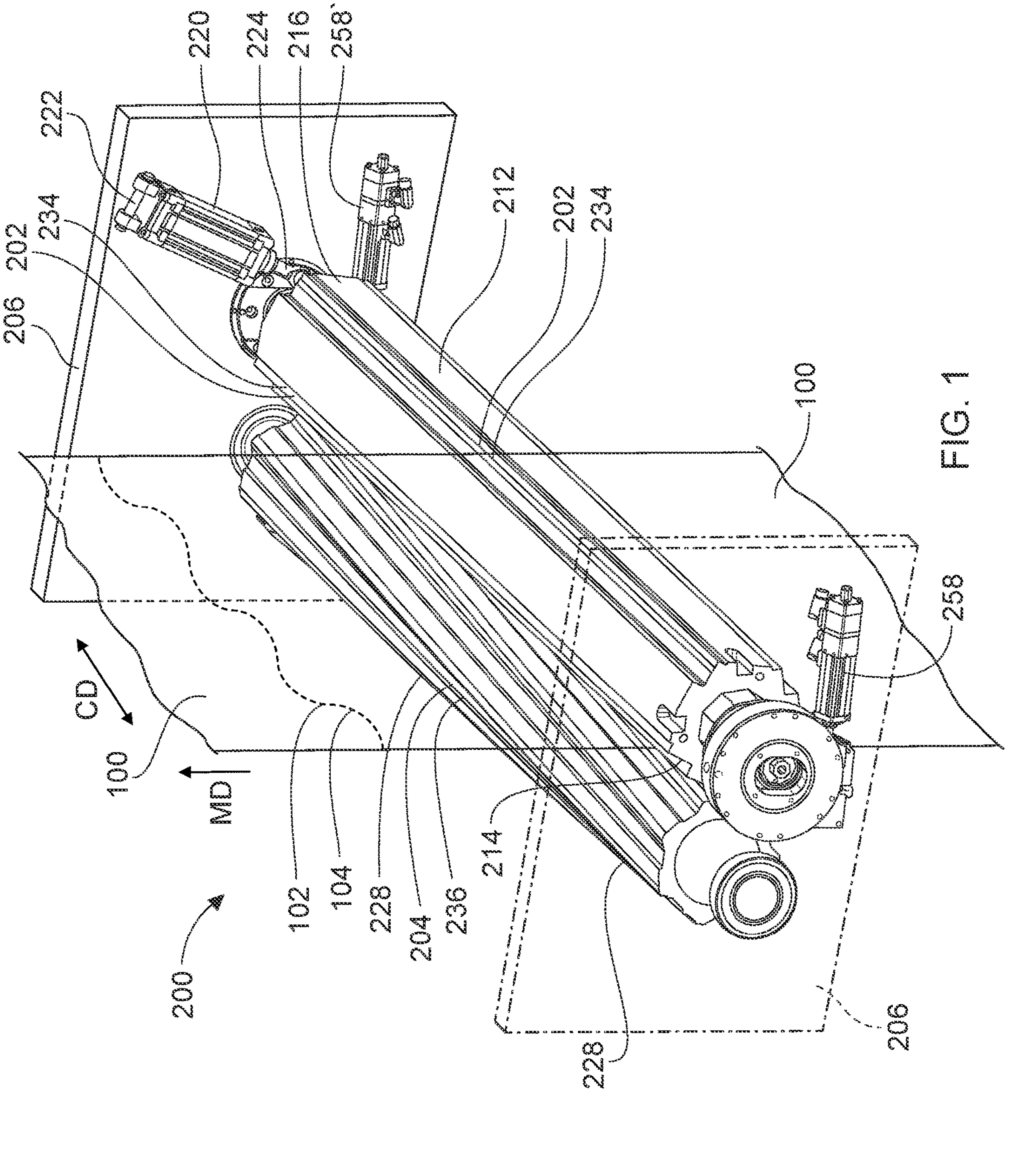
FIG. 1 is an isometric view of a perforating apparatus.

"Fibrous structure" as used herein means a structure that comprises one or more fibrous elements. In one example, a fibrous structure according to the present disclosure means an association of fibrous elements that together form a structure capable of performing a function. A nonlimiting example of a fibrous structure of the present disclosure is an absorbent paper product, which may be a sanitary tissue product such as a paper towel, bath tissue, or other rolled, absorbent paper product.

Non-limiting examples of processes for making fibrous structures include known wet-laid papermaking processes, air-laid papermaking processes, and wet, solution, and dry filament spinning processes, for example meltblowing and spunbonding spinning processes, that are typically referred to as nonwoven processes. Such processes may comprise the steps of preparing a fiber composition in the form of a suspension in a medium, either wet, more specifically aqueous medium, or dry, more specifically gaseous, i.e. with air as medium. The aqueous medium used for wet-laid processes is oftentimes referred to as fiber slurry. The fibrous suspension is then used to deposit a plurality of fibers onto a forming wire or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking and may subsequently be converted into a finished product (e.g., a sanitary tissue product).

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present disclosure may be spun from polymer melt compositions via suitable spinning operations, such as meltblowing and/or spunbonding and/or they may be obtained from natural sources such as vegetative sources, for example trees.

The fibrous elements of the present disclosure may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that may be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol, thermoplastic polymer, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

"Fiber" as used herein means an elongate particulate as described above that exhibits a length of less than 5.08 cm (2 in.) and/or less than 3.81 cm (1.5 in.) and/or less than 2.54 cm (1 in.). A fiber may be elongate physical structure having an apparent length greatly exceeding its apparent diameter (i.e., a length to diameter ratio of at least about 10.) Fibers having a non-circular cross-section and/or tubular shape are common; the "diameter" in this case may be considered to be the diameter of a circle having a cross-sectional area equal to the cross-sectional area of the fiber.

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers.

Staple fibers may be produced by spinning a filament tow and then cutting the tow into segments of less than 5.08 cm (2 in.) thus producing fibers.

In one example of the present disclosure, a fiber may be a naturally occurring fiber, which means it is obtained from a naturally occurring source, such as a vegetative source, for example a tree and/or other plant. Such fibers are typically used in papermaking and are oftentimes referred to as papermaking fibers. Papermaking fibers useful in the present disclosure include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers may be blended, or alternatively, may be deposited in layers to provide a stratified web. Also applicable to the present disclosure are fibers derived from recycled paper, which may contain any or all of the above categories of fibers as well as other non-fibrous polymers such as fillers, softening agents, wet and dry strength agents, and adhesives used to facilitate the original papermaking.

In addition to the various wood pulp fibers, other cellulosic fibers such as cotton linters, rayon, lyocell, and bagasse fibers may be used in the fibrous structures of the present disclosure.

"Sanitary tissue product" as used herein means one or more finished fibrous structures, that is useful as a wiping implement for post-urinary and post-bowel movement cleaning (e.g., toilet tissue, also referred to as bath tissue, and wet wipes), for otorhinolaryngological discharges (e.g., facial tissue), and multi-functional absorbent and cleaning and drying uses (e.g., paper towels, shop towels). The sanitary tissue products may be embossed or not embossed and creped or uncreped.

In one example, sanitary tissue products rolled about a fibrous core of the present disclosure may have a basis weight between about 10 g/m2 to about 160 g/m2 or from about 20 g/m2 to about 150 g/m2 or from about 35 g/m2 to about 120 g/m2 or from about 55 to 100 g/m2, specifically reciting all 0.1 g/m2 increments within the recited ranges. In addition, the sanitary tissue products may have a basis weight between about 40 g/m2 to about 140 g/m2 and/or from about 50 g/m2 to about 120 g/m2 and/or from about 55 g/m2 to about 105 g/m2 and/or from about 60 to 100 g/m2, specifically reciting all 0.1 g/m2 increments within the recited ranges. Other basis weights for other materials, such as wrapping paper and aluminum foil, are also within the scope of the present disclosure.

"Basis Weight" as used herein is the weight per unit area of a sample reported in lbs/3000 ft2 or g/m 2. Basis weight may be measured by preparing one or more samples to create a total area (i.e., flat, in the material's non-cylindrical form) of at least 100 in2 (accurate to +/−0.1 in2) and weighing the sample(s) on a top loading calibrated balance with a resolution of 0.001 g or smaller. The balance is protected from air drafts and other disturbances using a draft shield. Weights are recorded when the readings on the balance become constant. The total weight (lbs or g) is calculated and the total area of the samples (ft2 or m2) is measured. The basis weight in units of lbs/3,000 ft2 is calculated by dividing the total weight (lbs) by the total area of the samples (ft2) and multiplying by 3000. The basis weight in units of g/m2 is calculated by dividing the total weight (g) by the total area of the samples (m2).

"Density" as used herein is calculated as the quotient of the Basis Weight expressed in grams per square meter divided by the Caliper expressed in microns. The resulting Density is expressed as grams per cubic centimeter (g/cm3 or g/cc). Sanitary tissue products of the present disclosure may have a density of greater than about 0.05 g/cm3 and/or greater than 0.06 g/cm3 and/or greater than 0.07 g/cm3 and/or less than 0.10 g/cm3 and/or less than 0.09 g/cm3 and/or less than 0.08 g/cm3 and/or less than 0.60 g/cm3 and/or less than 0.30 g/cm3 and/or less than 0.20 g/cm3 and/or less than 0.15 g/cm3 and/or less than 0.10 g/cm3 and/or less than 0.07 g/cm3 and/or less than 0.05 g/cm3 and/or from about 0.01 g/cm3 to about 0.20 g/cm3 and/or from about 0.02 g/cm3 to about 0.15 g/cm3 and/or from about 0.02 g/cm3 to about 0.10 g/cm3.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure may effectively form a multi-ply fibrous structure, for example, by being folded on itself.

"Rolled product(s)" as used herein include plastics, fibrous structures, paper, sanitary tissue products, paperboard, polymeric materials, aluminum foils, and/or films that are in the form of a substrate, also referred to herein as a "web," and may be wound about a core. For example, the sanitary tissue product may be convolutedly wound upon itself about a core or without a core to form a sanitary tissue product roll or may be in the form of discrete sheets, as is commonly known for toilet tissue and paper towels.

"Machine Direction," MD, as used herein is the direction of manufacture for a perforated substrate. The machine direction may be the direction in which a substrate is advanced through a perforating apparatus that may comprise a rotating roll and support member, as discussed below in one embodiment. The machine direction may be the direction in which a substrate travels while advancing between a blade and an anvil of a perforating apparatus.

"Cross Machine Direction" or "Cross Direction," CD as used herein is the direction substantially perpendicular to the machine direction. The cross machine direction or cross direction may be substantially perpendicular to the direction in which a substrate is fed through a cylinder and lower support in one embodiment. The cross machine direction or cross direction may be the direction substantially perpendicular to the direction in which a substrate travels while advancing between a blade and an anvil.

Aspects of the present disclosure relate to methods and apparatuses for forming lines of weakness in rolled products, and in particular, to apparatuses and methods for adjusting and maintaining a position of a cutting surface used to create lines of weakness for rolled products. As discussed below, a perforating apparatus may include a frame and a housing rotatably supported by the frame, wherein the housing is adapted to rotate about a first axis. A support member may be rotatably supported by the housing, wherein the support member is adapted to rotate about a second axis, and wherein the second axis is offset from the first axis. The support member includes a first cutting surface. A roll is positioned adjacent the support member, wherein the roll is adapted to rotate about a third axis. And the roll includes a second cutting surface adapted to intermittently contact the first cutting surface as the roll rotates about the third axis.

The perforating apparatus according to the present disclosure is configured such that the function of adjusting the position of the first cutting surface and the function of holding the first cutting surface in a fixed position are separate. As discussed in more detail below, the perforating apparatus may also include a holding device connected with the frame, wherein the holding device is selectively operable in a first configuration and a second configuration. In the first configuration, the housing is permitted to rotate about the first axis to selectively move the first cutting surface toward and away from the roll. In the second configuration, the housing is fixedly connected with the frame to maintain a fixed distance between the first cutting surface and the first axis and/or the third axis. As such, the position of the first blade may be adjusted when the holding device is in the first configuration. And the position of the first blade is maintained in a fixed position when the holding device is in the second configuration. Thus, with the holding device in the second configuration, a substrate may be advanced between the first cutting surface and the rotating roll. In turn, the advancing substrate is perforated to form a line of weakness.

It is to be appreciated that various process and equipment configurations may be used to perforate a substrate 100. For example, FIG. 1 illustrates one example of an apparatus 200 for perforating substrates according to the present disclosure. In operation, the substrate 100 advances in a machine direction MD between a stationary first cutting surface 202 and a rotating second cutting surface 204 that creates a plurality of perforations 102 in the substrate 100. As such, the perforations 102 imparted to the substrate 100 forms a line of weakness 104. It is to be appreciated that the line of weakness 104 may be formed to extend in a straight line along the cross direction CD and/or may be formed to define an arcuate or non-linear line along the cross direction CD.

Figure 2:
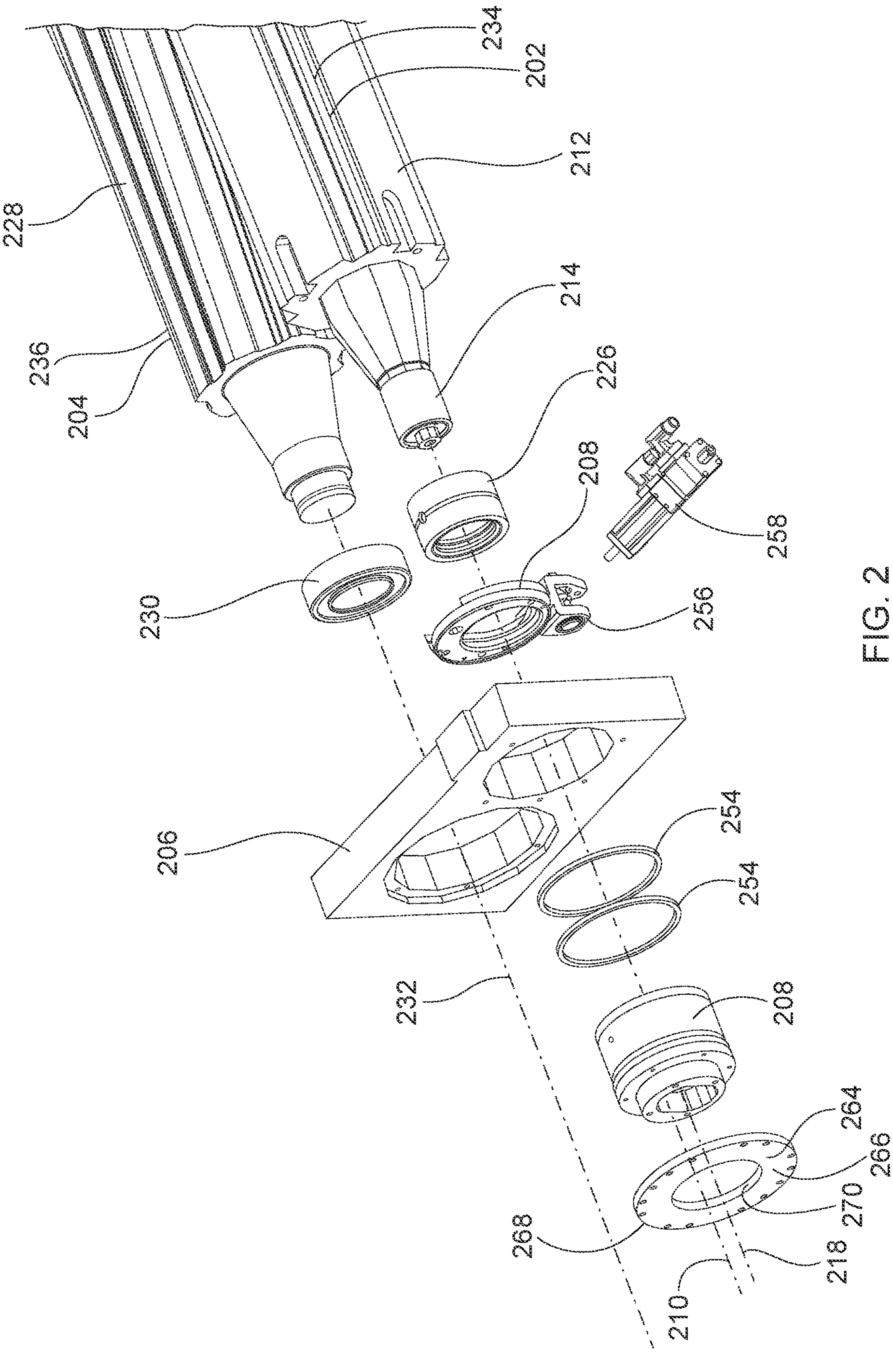
FIG. 2 is an exploded assembly view of the perforating apparatus of FIG. 1.
Figure 3:
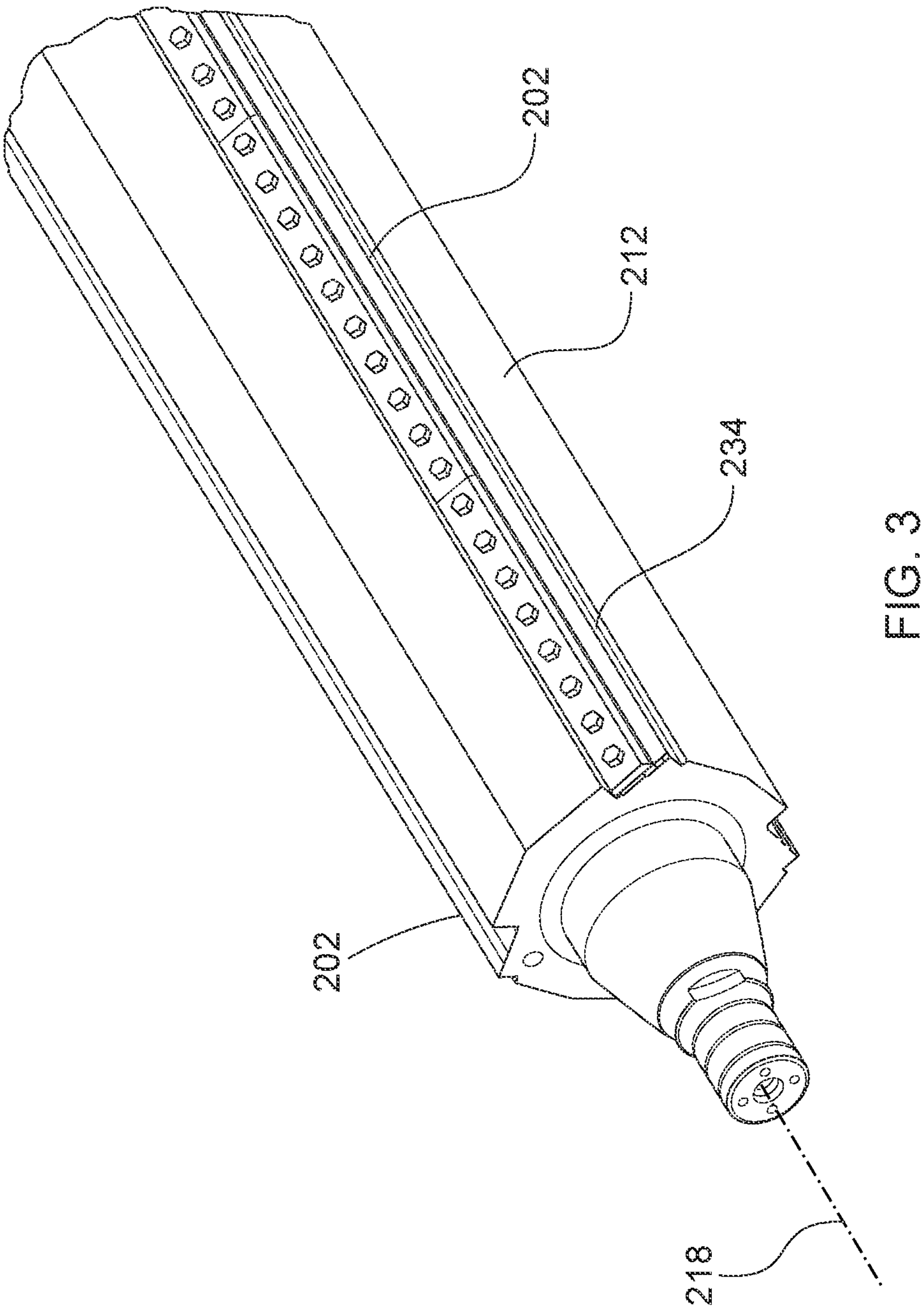
FIG. 3 is a detailed view of a portion of a support member and a first cutting surface.

With reference to FIGS. 1 and 2, the perforating apparatus 200 may include a frame 206 that rotatably supports a housing 208, wherein the housing 208 is adapted to rotate about a first axis 210. The perforating apparatus 200 may also include a support member 212 having a first end portion 214 and an opposing second end portion 216, wherein the housing 208 rotatably supports the first end portion 214. The support member 212 may be adapted to rotate about a second axis 218. The support member 212 includes the first cutting surface 202. As shown in FIGS. 1 and 3, the support member 212 may include more than one first cutting surfaces 202 circumferentially spaced from each other about the second axis 218. As such, the support member 212 may be rotated about the second axis 218 to remove one first cutting surface 202 from service and place another first cutting surface 202 into service. In some configurations, the perforating apparatus 200 may include a support member actuator 220 having a first end portion 222 connected with the frame 206 and an opposing second end portion 224 connected with the support member 212. The support member actuator 220 may be adapted to selectively increase and decrease in length between the first end portion 222 and the second end portion 224, and thus, rotate the support member 220 about the second axis 218 to selectively adjust circumferential positions of the first cutting surfaces 202. Thus, the support member actuator 220 may be configured to hold the first cutting surface 202 in a stationary position about the second axis 218 during the perforating operation, and may be configured to rotate the support member 212 about the second axis 218 to adjust the circumferential position of the first cutting surface 202 when perforating operations have ceased.

It is to be appreciated that the support member actuator 220 may be configured in various ways. For example, the support member actuator 220 may include a linear actuator comprising a rotary motor and a screw mechanism. The support member actuator 220 may also include a feedback device such as a rotary or linear encoder to transmit position data to a controller. It is to be appreciated that the support member actuator 220 may comprise various combinations of pneumatic, hydraulic, and/or electromechanical actuation means. In some arrangements, the support member actuator 220 may be configured to be manually operated, such as for example, a manually rotated jacking screw. In addition, as shown in FIG. 2, the apparatus 200 may include bearings 226 that rollingly connect the support member 212 with the housing 208, which may reduce the force required to rotate the support member 212 when adjusting the circumferential position of the first cutting surface 202.

With continued reference to FIGS. 1 and 2, the perforating apparatus 200 may also include a roll 228 rotatably supported by the frame 206. In addition, the apparatus 200 may include bearings 230 that rollingly connect the roll 228 with the frame 206. The roll 228 may be positioned adjacent the support member 212 and may be adapted to rotate about a third axis 232. A shown in FIG. 4, the roll 228 may include one or more second cutting surfaces 204 circumferentially spaced apart from each other around the third axis 232. As such, the second cutting surfaces 204 may be adapted to intermittently contact the first cutting surface 202 as the roll 228 rotates about the third axis 232 to create perforations 102 in advancing the substrates 100 to form lines of weakness 104. The perforating apparatuses 200 herein may be configured to produce rolled products having various qualities and characteristics, such as described for example, in U.S. Provisional Patent Application No. 62/556,720.

Figure 4:
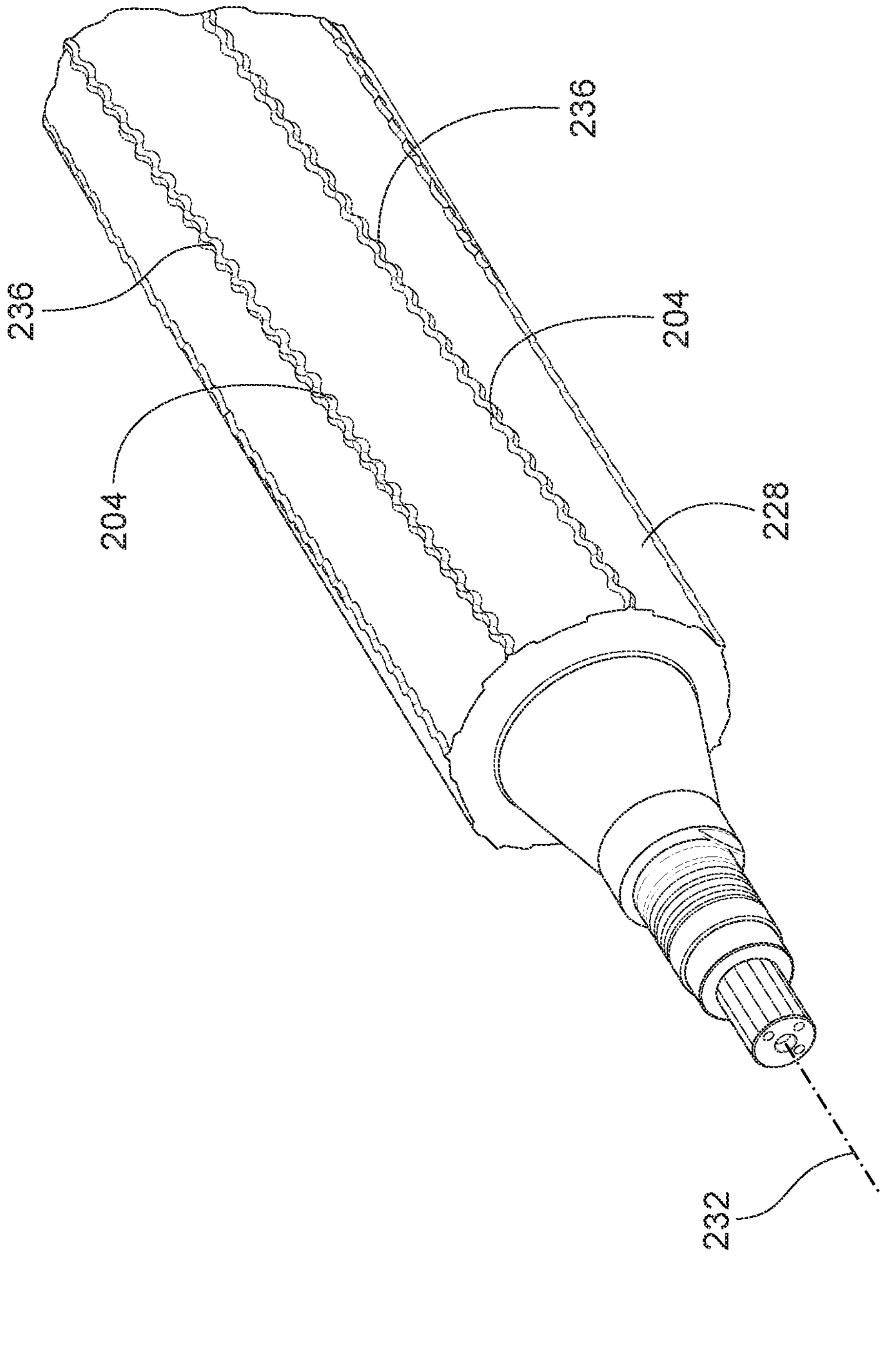
FIG. 4 is a detailed view of a portion of roll and a second cutting surface.
Figure 5:
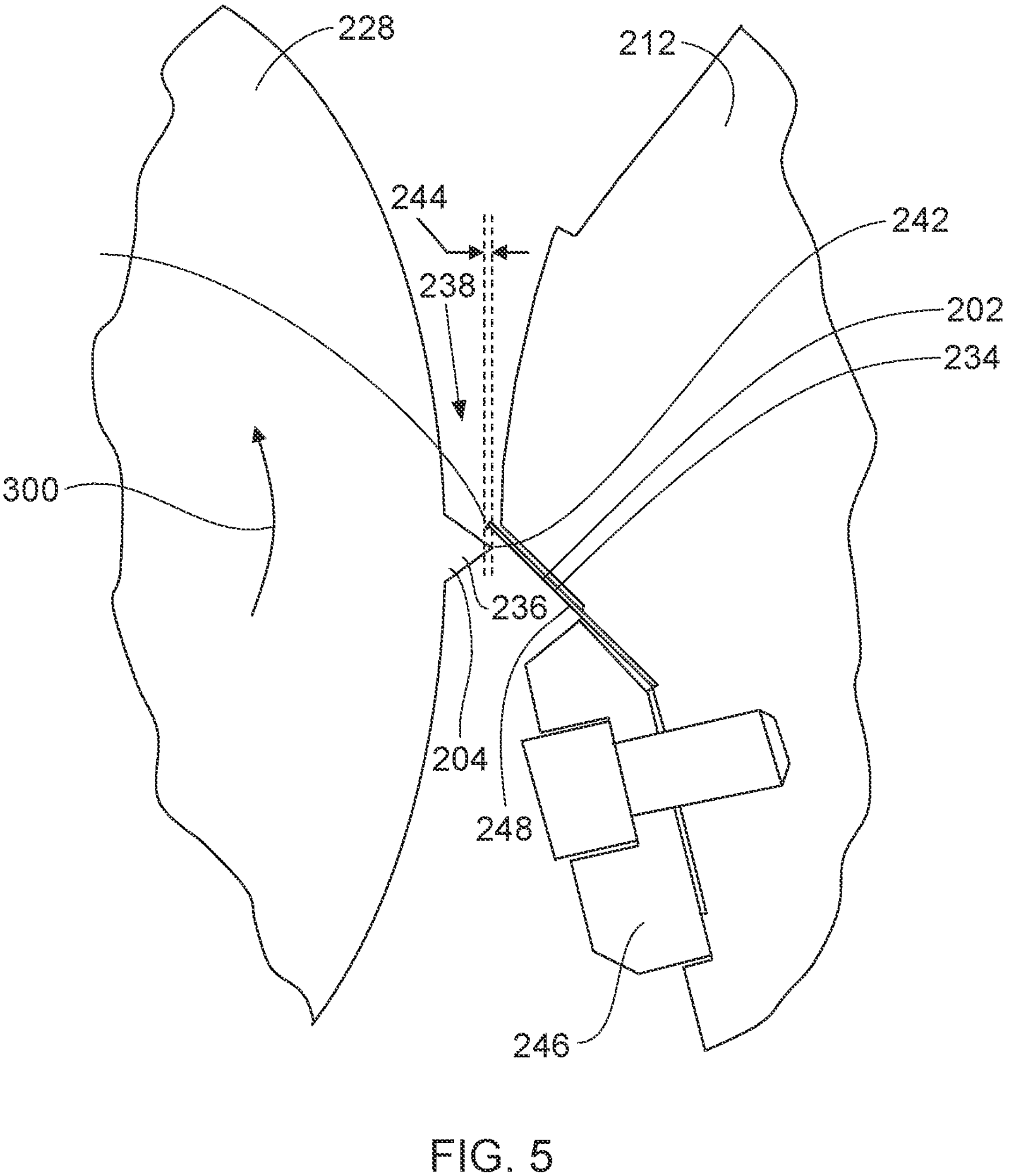
FIG. 5 is a detailed side view of a first cutting surface and a second surface.

As discussed above with reference to FIG. 1, the substrate 100 advances between the first cutting surface 202 and the second cutting surface 204. The first cutting surface 202 and the second cutting surface 204 operate in contacting relationship to perforate the advancing substrate 100. It is to be appreciated that the first cutting surface 202 and the second cutting surface 204 may be configured in various ways. For example, as shown in FIGS. 3-5, the first cutting surface 202 may be configured as a blade 234 and the second cutting surface 206 may be configured as an anvil 236. During the perforating operation, the blade 234 may be held in a fixed position and the anvil 236 may rotate about the third axis 232. A nip 238 is defined where the anvil 236 contacts the blade 234. In some configurations, the second cutting surface 204 may be helically arranged on the roll 228.

With continued reference to FIG. 5, the blade 234 may be positioned such that a distal edge 240 of the blade 234 overlaps a distal edge 242 of the anvil 236 by an overlap distance 244. The overlap distance 244 is measured from the distal edge 240 of the blade 234 to the distal edge 242 of the anvil 236 in a direction substantially parallel to the cross direction. By decreasing the overlap distance 244, the perforations 102 may generally become relatively less pronounced, less visible, shorter, and/or the unperforated regions may generally become wider and thus stronger. If the overlap distance 244 is too small, the blade 234 and anvil 236 may fail to operatively engage during operation, and the substrate 100 may not be adequately perforated. In turn, the resulting characteristics of the line of weakness 104 may be unacceptable from a manufacturing standpoint and/or from a consumer acceptance/use standpoint. By increasing the overlap distance 244, the perforations 102 may generally become relatively more pronounced, more visible, and longer. If the overlap distance 244 becomes too large, the substrate 100 may be unable to advance through the nip 238 and/or the substrate 100 may be separated such that the line of weakness 104 fails during processing. In turn, the substrate 100 may be split along the line of weakness 104 or adjacent to the line of weakness 104. In some configurations, the overlap distance 244 may be from about 0.002 inches to about 0.1 inches. As discussed in more detail below, the overlap distance 244 may be adjusted by moving the blade 234 and support member 212.

It is to be appreciated that the support member 212 may be configured in various ways. For example, the support member 212 may be formed from metal, such as steel or a steel alloy, or from some other material as would be known to those skilled in the art to be suitable as a structural support of perforating equipment. The support member 212 may be formed in a block shape, a cylindrical shape, or another shape to support a blade. The support member 212 and blade 234 may be placed in a fixed, non-moveable, non-rotatable position during contacting relationship with the anvil 236. As previously described, the support member 212 may be rotated about the second axis 218 to remove a particular blade 234 from service and fixed in a position so that a replacement blade 234 may be placed in contacting relationship with the anvil 236. As discussed above, a support member actuator 220 may be used to selectively rotate the support member 212 and fix the rotational position of the support member 212 about the second axis 218.

As shown in FIG. 5, a portion of the blade 234 may be connected with the support member 212 with a clamp member 246. The clamp member 246 and the support member 212 may hold the blade 234 in position such that a portion of the blade 234 extends outward from the support member 212 and is exposed for contact with the anvil 236. As such, the distal edge 240 and a first blade surface 248 may be exposed such that the anvil 236 operatively engages a portion of the first blade surface 248 and the distal edge 240 of the blade 234. The blade 234 may be held between the clamp member 246 and the support member 212 such that the blade 234 may deflect during operative engagement with the anvil 236, which may be referred to as a flex-rigid configuration. In some examples, the blade 234 interacts with the anvil 236 in a shearing action. The deflection and the inherent flexibility of the blade 234 may allow for relatively improved perforation reliability by being relatively more forgiving to slight differences in machine tolerances.

Figure 5A:
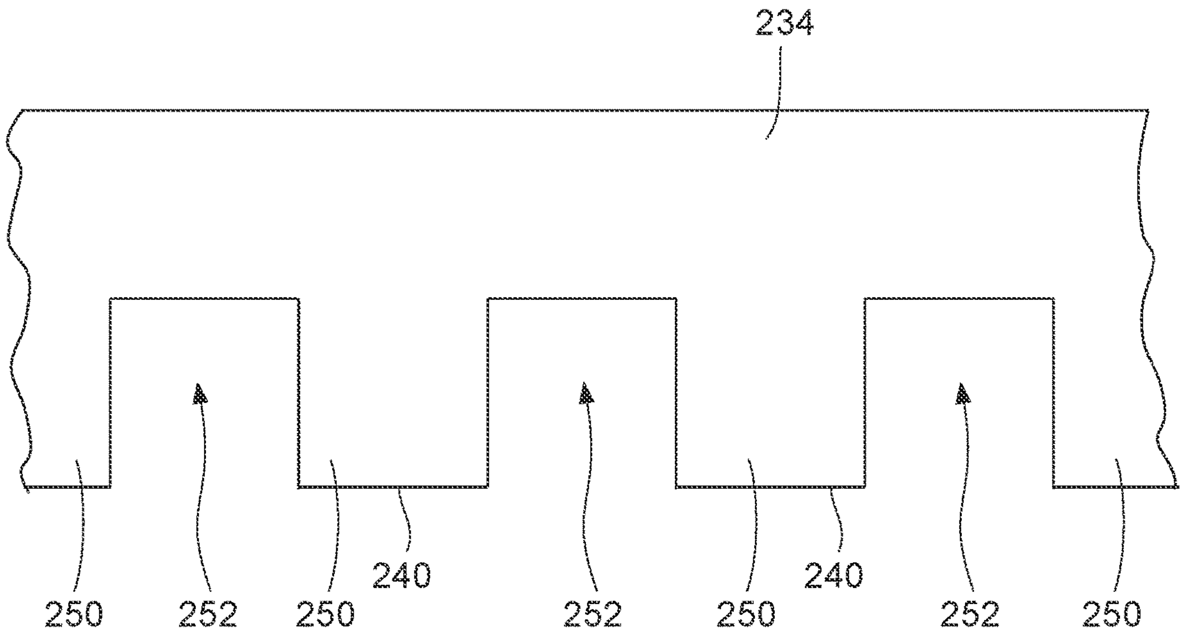
FIG. 5A is a side view of a first cutting surface configured as a blade.

It is to be appreciated that a support member 212 may include more than one blade configurations. In some configurations, such as shown in FIG. 5A, the distal edge 240 of the blade 234 may be defined by a plurality of blades 234, also referred to herein as teeth 250, separated from each other by notches 252 to define a discontinuous distal edge 240. For example, each notch 252 may separate a first blade 250 from a second blade 250. The blade 234 may be made from metal such as steel, tungsten, or any other hardened material that may withstand engagement with the anvil 236. The blade 234 may include a number of teeth 250 extending along a total blade length. The spacing and number of teeth 250 may be determined based on the desired number of perforations 102 and characteristics of the line of weakness 104 in the substrate 100, such as disclosed in U.S. Patent Publication Nos. 2014/0366695; 2014/0366702; and 2014/0370224. The teeth 250 may be equally spaced along the total blade length or the teeth 250 may be spaced at various increments along the total blade length. In some configurations, the distal edge 240 of the blade 234 may not include notches 252 and teeth 250 and may be configured as a blade 234 with a single distal edge 240 extending contiguously in the cross direction CD.

It is to be appreciated that the roll 228 and anvil 236 may be configured in various ways. For example, the anvil 236 may be made from the same material or different material as the roll 228. The anvil 236 may be made from a material that provides sufficient rigidity and life, strength and wear resistance, such that the anvil 236 does not deflect or deflects minimally when engaging the blade 234 and can sustain relatively prolonged manufacturing run time. The anvil 236 may be made from metal such as steel, aluminum, or tungsten carbide. The anvil 236 may also be made from non-metal such as ceramic, carbon fiber, or hard plastic. It is also to be appreciated that the anvil 236 may be made from two or more different materials. In some configurations, the anvil 236 may extend in the cross direction CD along a straight line in the cross direction CD. In some configurations, the anvil 236 may include curved portions extending along the cross direction CD.

Although the first cutting surface 202 is described above in the form of a blade 234 and the second cutting surface 204 is described above in the form of an anvil 236, it is to be appreciated that the perforating apparatus may be configured various ways, such as disclosed for example, in U.S. Patent Publication Nos. 2014/0366695; 2014/0366702; 2014/0370224; 2016/0271820; 2016/0271823; and 2016/0271824 and U.S. Provisional Patent Application Nos. 62/556,628; 62/556,633; and 62/556,720, all of which are incorporated by reference herein. In some configurations, the first cutting surface 202 may be configured as an anvil 236 and the second cutting surface 204 may be configured as a blade 234. In some configurations, the first cutting surface 202 and the second cutting surface 204 may both be configured as blades 234. In some configurations, the blade 234 may be configured with a continuous distal surface and the anvil may configured with a plurality of anvil surfaces, also referred to herein as teeth, separated from each other by notches to define a discontinuous distal edge. The perforating apparatus may also be configured such that the blade 234 may oscillate in the cross direction CD during the perforation process. For example, the blade 234 may oscillate by moving a first direction, substantially parallel to the cross direction CD, by a predetermined amount and, subsequently, moving in a second direction, opposite the first direction by another predetermined amount. The blade 234 may oscillate by the same distance in both the first direction and the second direction, or the blade may oscillate by a different distance in the first direction and the second direction. The oscillation of the blade 234 may aid in reducing wear on the blade during processing and may allow for the blade to wear more uniformly than if the blade remained stationary. Examples of oscillating blades are disclosed in U.S. Patent Publication Nos. 2016/0271820; 2016/0271823; and 2016/0271824.

Figure 6:
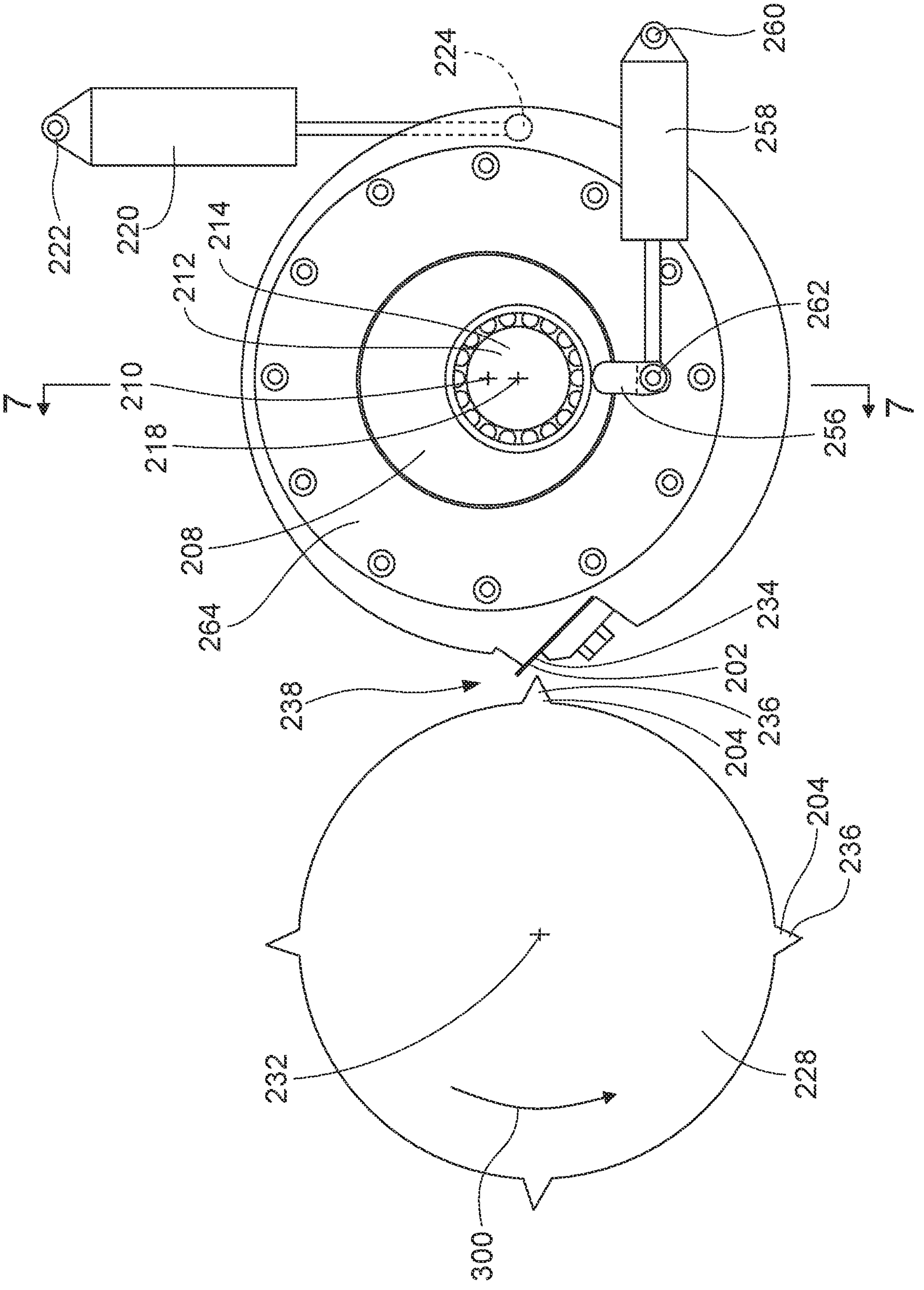
FIG. 6 is left side view of a perforating apparatus.
Figure 7:
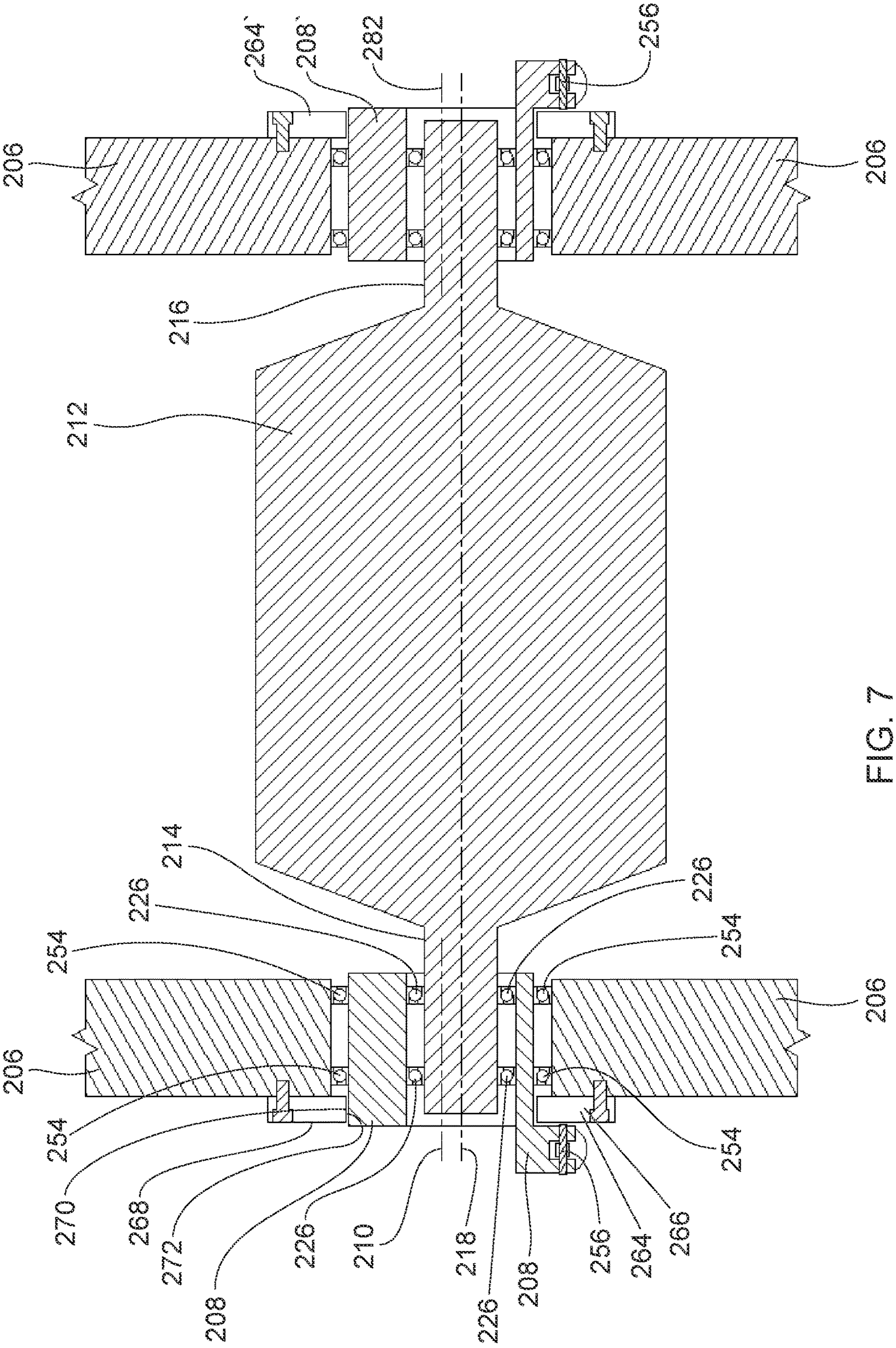
FIG. 7 is a cross sectional side view of the perforating apparatus taken along the sectional line 7-7 of FIG. 6.

As previously mentioned, the perforating apparatus 200 may be adapted to allow a user to selectively move the first cutting surface 202 to adjust engagement between the first cutting surface 202 and the second cutting surface 204. As shown in FIGS. 6 and 7, the second axis 218 about which the support member 212 may rotate is offset from the first axis 210 about which the housing 208 may rotate. As such, when the housing 208 is rotated in a first direction, the first cutting surface 202 may move away from the first axis 210 and/or toward the third axis 232. In addition, when the housing 208 rotates in a second direction opposite the first direction, the first cutting surface 202 may move toward the first axis 210 and/or away from the third axis 232. As shown in FIGS. 2 and 7, the apparatus 200 may also include bearings 254 that rollingly connect the housing 208 with the frame 206, which may reduce the force needed to rotate the housing 208 when adjusting the positions of the first cutting surface 202 and may provide for a precise center of rotation of the housing 208 about the first axis 210. It is also to be appreciated that the first axis 210 and the second axis 218 may or may not be parallel.

It is to be appreciated that the perforating apparatus 200 may be configured in various ways to allow the housing 208 to be rotated about the first axis 210. For example, as shown in FIGS. 2 and 6, the housing 208 may include a tang 256 connected with a housing actuator 258. The housing actuator 258 may include a first end portion 260 connected with the frame 206 and an opposing second end portion 262 connected with the tang 256 and may be adapted to selectively increase and decrease in length between the first end portion 260 and the second end portion 262. As such, the housing actuator 258 may be adapted to push against or pull on the tang 256 to rotate the housing 208 about the first axis 210, which in turn, causes the first cutting surface 202 to move toward or away from the roll 228. The housing actuator 258 may be configured in various ways, such as for example, a linear actuator, a hydraulic actuator, a pneumatic actuator, or a threaded rod. In some configurations, the housing actuator 258 may comprise a gear tooth surface, wherein gear teeth may interact with a pinion gear. As such, the pinion gear may be actuated to rotate the housing 208. In some configurations, the gear teeth may interact with a gear tooth rack which may be actuated in a linear motion to rotate the housing 208. In still another configuration the housing 208 may be directly connected with a motor or connected with a motor through a transmission, such as gears and/or belts.

As previously mentioned, the perforating apparatus 200 may be configured to separate the function of adjusting the position of the first cutting surface 202 from the function of holding the first cutting surface 202 in a fixed position. Thus, the perforating apparatus 200 may also be adapted to selectively hold the first cutting surface 202 in a fixed position after the first cutting surface 202 has been adjusted to a particular position. For example, as shown in FIGS. 2 and 7, the perforating apparatus 200 may include a holding device 264 connected with the frame 206. The holding device 264 may be selectively operable in a first configuration and a second configuration. For example, when the holding device 264 is placed in the first configuration, the holding device 264 may permit the housing 208 to rotate about the first axis 210 to selectively move the first cutting surface 202 toward and away from and the first axis 210 and/or the third axis 232, which in turn, adjusts the engagement between the first cutting surface 202 and the second cutting surface 204. When the holding device 264 is placed in the second configuration, the holding device 264 fixedly connects the housing 208 with the frame 206, and thus, prevents the housing 208 from being rotated about the first axis 210. With the housing 208 held in a fixed rotational position about the first axis 210, the first cutting surface 202 is maintained at a fixed distance between and the first axis 210 and/or the third axis 232, which in turn, maintains the engagement between the first cutting surface 202 and the second cutting surface 204 during operation.

It is to be appreciated that the holding device 264 may be configured in various ways. For example, as shown in FIGS. 2 and 7, the holding device 264 may be configured as a clamp 266. The clamp 266 may include a shell 268 fixedly connected with the frame 206 and may include a clamping surface 270 movably connected with the shell 268. The clamping surface 270 may be adapted to selectively engage and disengage from a corresponding surface 272 of the housing. For example, the clamping surface 270 may be selectively movable radially inward toward the first axis 210 and radially outward from the first axis 210. As such, when in the first configuration, the clamping surface 270 may be moved radially outward from the first axis 210 to disengage from the housing 208. With the clamping surface 270 disengaged from housing 208, the housing 208 may be rotated about the first axis 210 with the housing actuator 258 to adjust the position of the first cutting surface 202. When in the second configurations, the clamping surface 270 may be moved radially inward toward the first axis 210 and engage the surface 272 of the housing 208. With the clamping surface 270 engaged with housing 208, the clamp 266 fixedly connects the housing 208 with the frame 206. Thus, the housing 208 may be prevented from being rotated about the first axis 210, and in turn, the first cutting surface 202 is held in a fixed position.

In some configurations, the clamp 266 may be configured as a circular clamp adapted to prevent rotational movement, such as for example, a Rotoclamp available from HEMA Maschinen-und Apparateschutz GmbH. In some configurations, the housing 208 may comprise a series of surfaces substantially perpendicular to the first axis, such as a disk surface. The clamping surface may actuate and move substantially perpendicular to the disk surface, similar to a disk brake. It is to be appreciated that various forms of clamping technology may be applied to clamp the housing. In some configurations, the clamping forces may be applied by pneumatic, hydraulic, and/or mechanical means, such as springs. The clamping forces may utilize friction forces between the housing and clamping surface to hold the housing in a fixed position. In some configurations, the housing and clamping surfaces may be adapted for mechanical engagement, such as ridges or gear teeth. In some configurations, the clamp may be connected with the housing and may be operated between a first and second configuration to selectively move the clamping surface to engage and disengage with a surface of the frame.

It should be appreciated that the apparatus may be configured such that the clamp may not directly interact with the housing. For example, as previously described, the housing may comprise a gear tooth surface wherein a pinon gear or gear tooth rack may interface with the gear tooth surface. In such a configuration, the clamping mechanism may be adapted to interact with the pinion gear or gear tooth rack instead of directly interacting with the housing. In yet another example, the clamp may interact with a portion of the actuator such as with a rod lock mechanism.

Figure 8A:
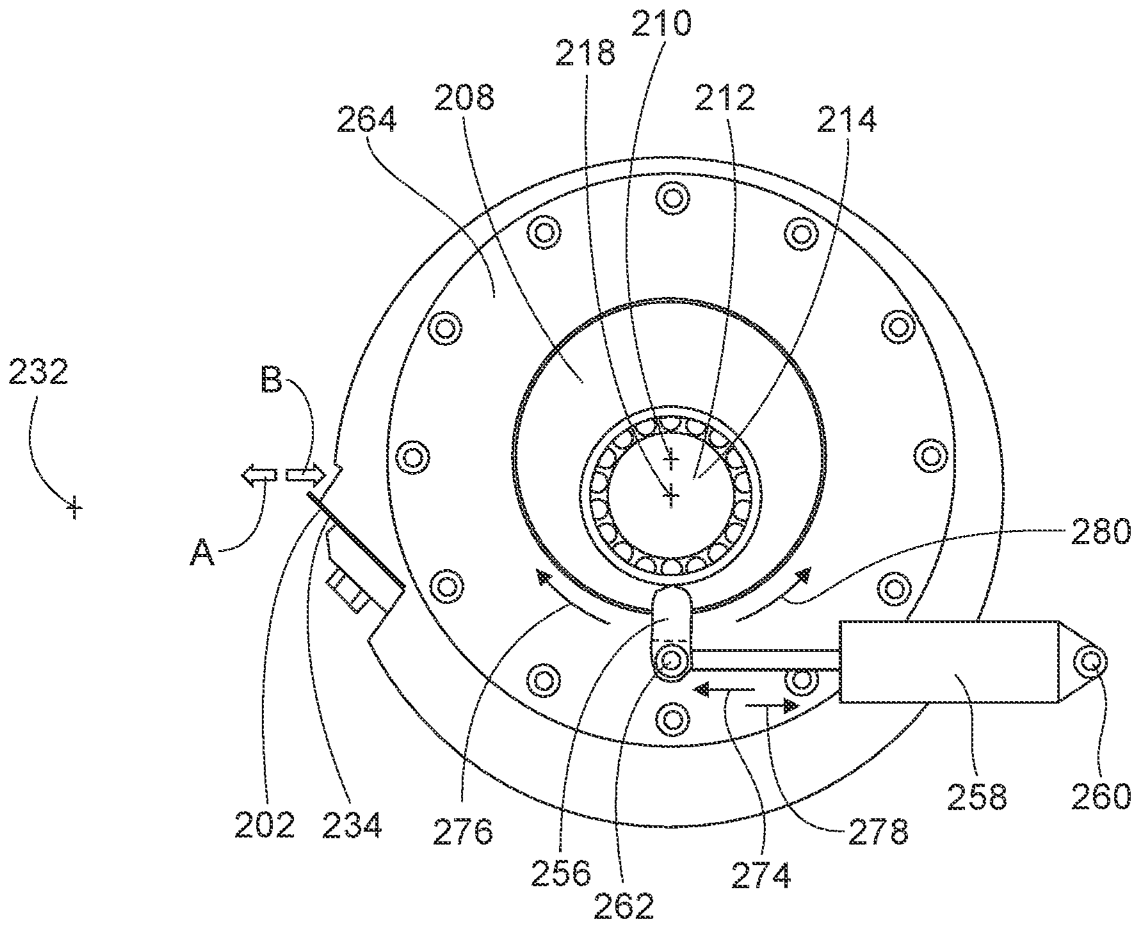
FIG. 8A is a schematic illustration of a holding device in a first configuration and a housing actuator moving a first cutting surface in a first direction or a second direction.

As discussed above and as illustrated in FIGS. 8A-8C, the perforating apparatus 200 may be configured such that the function of adjusting the position of the first cutting surface 202 is separate from the function of holding the first cutting surface 202 in a fixed position. For example, as shown in FIG. 8A, the holding device 264 may be placed the first configuration, wherein the holding device 264 disengages from the housing 208. For example, as discussed above, the clamping surface 270 discussed above may be moved radially outward from the first axis 210 to disengage from the housing 208. As such, the housing 208 is permitted to be rotated about the first axis 210 to adjust the position of the first cutting surface 202. For example, the housing actuator 258 may be operated to move the tang 256 in a first direction 274, which in turn rotates the housing in a first rotational direction 276. Because the first axis 210 is offset from the second axis 218, rotation of the housing 208 in the first rotational direction 276 causes the support member 212 and first cutting surface 202 to move in direction A. As shown in FIG. 8A, the first cutting surface 202 may move away from the first axis 210 and toward the third axis 232 when the housing 208 is rotated in the first rotational direction 276. In some configurations, moving the first cutting surface 202 in direction A away from the first axis 210 and/or toward the third axis 232 may increase the overlap distance 244 discussed above with reference to FIG. 5.

With continued reference to FIG. 8A, the housing actuator 258 may be operated to move the tang 256 in a second direction 278, which in turn rotates the housing 208 in a second rotational direction 280. Because the first axis 210 is offset from the second axis 218, rotation of the housing 208 in the second rotational direction 280 causes the support member 212 and first cutting surface 202 to move in direction B. As shown in FIG. 8A, the first cutting surface 202 may move toward the first axis 210 and away from the third axis 232 when the housing 208 is rotated in the second rotational direction 280. In some configurations, moving the first cutting surface 202 in direction B toward the first axis 210 and/or away from the third axis 232 may decrease the overlap distance 244 discussed above with reference to FIG. 5.

Figure 8B:
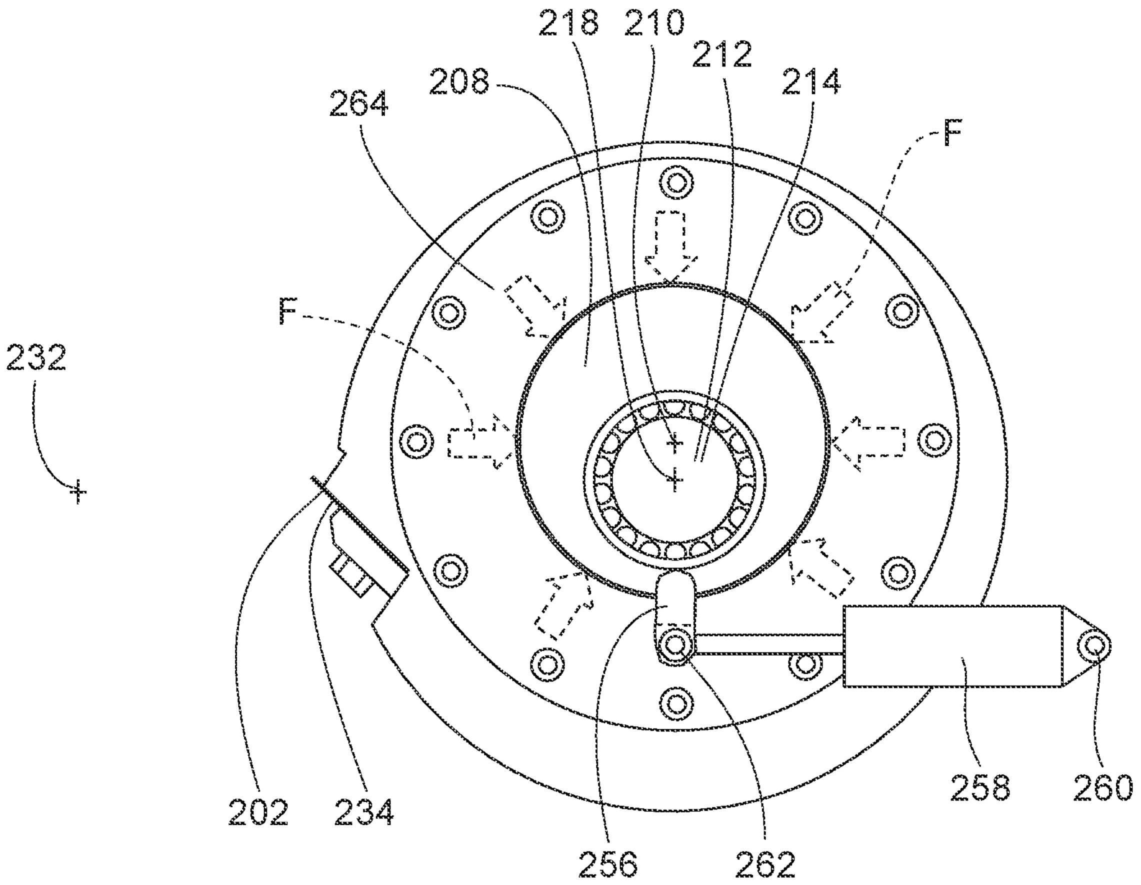
FIG. 8B is a schematic illustration of the holding device in a second configuration maintaining the first cutting surface in a fixed position.
Figure 8C:
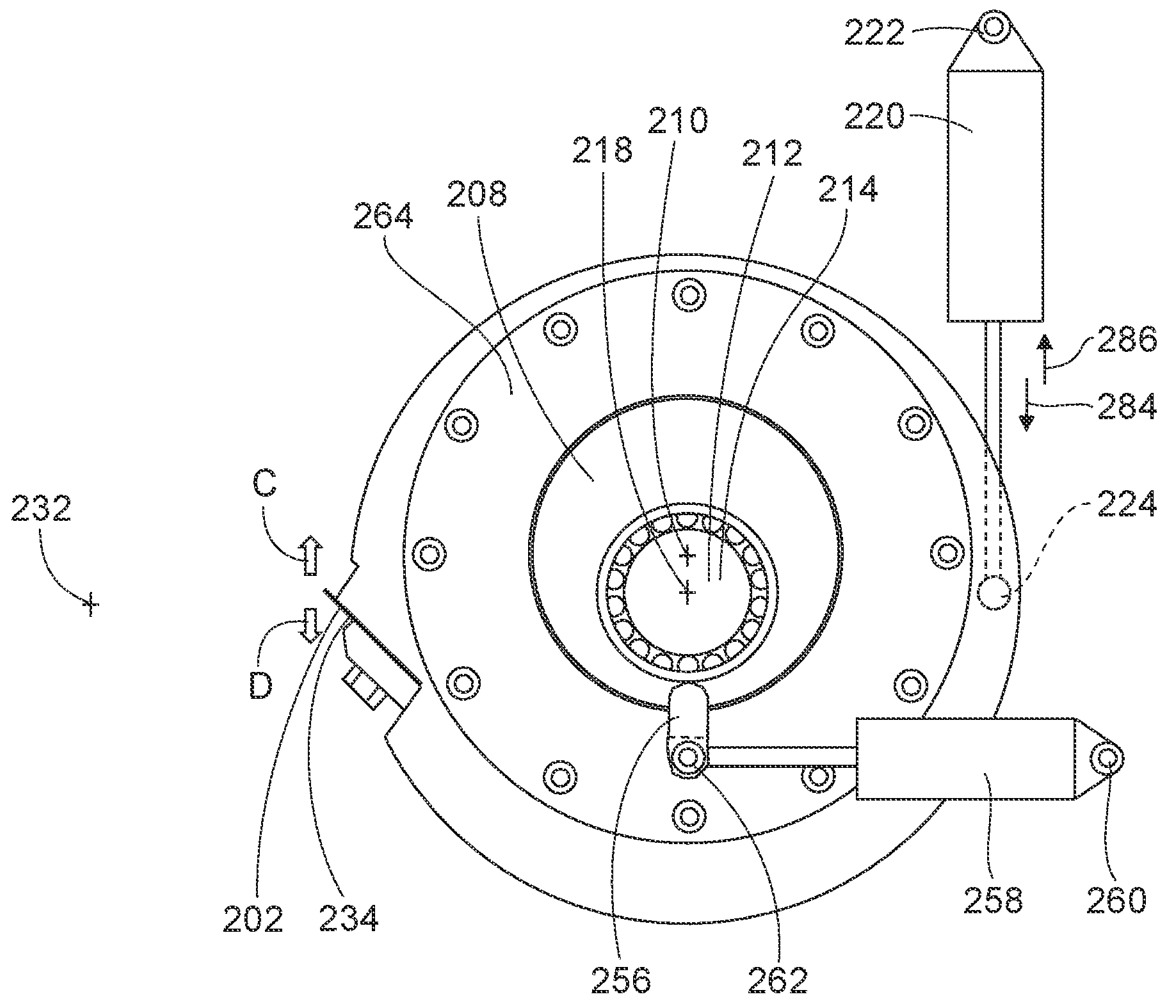
FIG. 8C is a schematic illustration of a support member actuator rotating the support member to adjust a circumferential position of the first cutting surface.

Referring now to FIG. 8B, once the first cutting surface 202 is placed in a particular position relative the first axis 210 and/or third axis 232, and/or the overlap distance 244 is set to a particular length, the holding device 264 may be placed in the second configuration, wherein the holding device 264 engages from the housing 208. For example, as discussed above, the clamping surface 270 may be moved radially inward toward the first axis 210 and engage the surface 272 of the housing 208 with forces F (schematically represented in FIG. 8B with dashed arrows), thus fixedly connecting the housing 208 with the frame 206. As such, the housing 208 is prevented from being rotated about the first axis 210. In turn, the first cutting surface 202 may be held in a fixed position relative to the first axis 210 and the third axis 232. And in some configurations, the overlap distance 244 discussed above with reference to FIG. 5 may be held at a fixed length.

As discussed above and as schematically represented in FIG. 8C, the perforating apparatus 200 may also include a support member actuator 220 adapted to rotate the support member 212 about the second axis 218 to selectively adjust circumferential positions of the first cutting surfaces 202. The support member actuator 220 may be configured to hold the first cutting surface 202 in a stationary circumferential position relative the second axis 218, and may be configured to rotate the support member 212 about the second axis 218 to adjust the circumferential position of the first cutting surface 202 relative the second axis 218. For example, the support member actuator 220 may be operated to move the second end portion 224 connected with the support member 212 in a first direction 284, which in turn rotates the support member 212 and causes the first cutting surface 202 to move in direction C. In another example, the support member actuator 220 may be operated to move the second end portion 224 connected with the support member 212 in a second direction 286, which in turn rotates the support member 212 and causes the first cutting surface 202 to move in direction D.

It is to be also be appreciated that the perforating apparatus 200 may be configured in various ways to adjust and maintain the position of the first cutting surface. For example, as shown in FIGS. 1 and 7, the perforating apparatus may include a second housing 208', a second housing actuator 258' adapted to rotate about a fourth axis 282 offset from the second axis 218, and/or a second holding device 264' operatively associated with the second end portion 216 of the support member 212. Such second housing 208', second housing actuator 258', and/or second holding device 264' may also be arranged and/or operate in a relationship that mirrors the housing 208, housing actuator 258, and holding mechanism 264 described above with reference to the first end portion 214 of support member 212. In some configurations, housings and holding mechanisms arranged at opposing end portions of the support member 212 may be operated simultaneously with each other or independent of each other when adjusting the position the first cutting surface 202 to help ensure uniform engagement across the width of the perforating apparatus 200.

It is also to be appreciated that the perforating apparatus 200 may be configured with housings, actuators, and holding devices as described herein that may be operatively connected with the roll 236 and frame 206 and adapted to selectively adjust the positions of second cutting surface 204 of the roll 236.

This application claims the benefit of U.S. Provisional Application No. 62/729,441 filed on Sep. 11, 2018, which is incorporated herein by reference.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A perforating apparatus comprising:

a frame;

a housing rotatably supported by the frame, the housing adapted to rotate about a first axis;

a support member rotatably supported by the housing, the support member adapted to rotate about a second axis, the second axis being offset from the first axis, the support member comprising a first cutting surface;

a roll positioned adjacent the support member, the roll adapted to rotate about a third axis, the roll comprising a second cutting surface adapted to intermittently contact the first cutting surface that is adapted to remain stationary about the second axis as the roll rotates about the third axis to form perforations in a substrate passed between the first and second cutting surfaces in a machine direction;

a support member actuator configured to hold the first cutting surface in a stationary position about the second axis during the formation of perforations and configured to rotate the support member about the second axis to selectively adjust a circumferential position of the first cutting surface when perforations are not being formed in the substrate; and a holding device selectively operable in a first configuration and a second configuration;

wherein in the first configuration, the housing is permitted to rotate about the first axis; and wherein in the second configuration, the housing is fixedly connected with the frame to maintain a fixed distance between the first cutting surface and the third axis.

2. The perforating apparatus of claim 1, wherein the first cutting surface comprises at least one blade.

3. The perforating apparatus of claim 2, wherein the at least one blade comprises a first tooth and a second tooth separated by a notch.

4. The perforating apparatus of claim 1, wherein the second cutting surface comprises at least one blade.

5. The perforating apparatus of claim 4, wherein the at least one blade comprises a first tooth and a second tooth separated by a notch.

6. The perforating apparatus of claim 1, wherein the first cutting surface comprises an anvil.

7. The perforating apparatus of claim 1, wherein the second cutting surface comprises an anvil.

8. The perforating apparatus of claim 1, wherein the holding device comprises a clamp.

9. The perforating apparatus of claim 8, wherein the clamp is connected with the frame, and wherein the clamp comprises a clamping surface adapted to selectively engage a surface of the housing in the second configuration and disengage from the surface of the housing in the first configuration.

10. The perforating apparatus of claim 9, wherein the clamping surface is selectively movable radially inward toward the first axis and radially outward from the first axis.

11. The perforating apparatus of claim 10 further comprising a housing actuator with a first end portion connected to the frame and a second end portion connected with a tang of the housing;

wherein in the second configuration the clamping surface is configured to move radially inward and engage the surface of the housing to fixedly connect the housing within the frame;

wherein in the first configuration the clamping surface is configured to move radially outward to disengage the surface of the housing such that the housing can be rotated about the first axis by the housing actuator based on selectively increasing or decreasing a length between the first end portion and the second end portion of the housing actuator.

12. The perforating apparatus of claim 1, further comprising bearings rollingly connecting the housing with the frame.

13. The perforating apparatus of claim 1, further comprising bearings rollingly connecting the support member with the housing.

14. The perforating apparatus of claim 1, further comprising a first actuator connected with the housing and adapted to rotate the housing about the first axis.

15. The perforating apparatus of claim 14, wherein the first actuator comprises a servo motor.

16. The perforating apparatus of claim 14, wherein the first actuator comprises a linear actuator.

17. The perforating apparatus of claim 14, further comprising a second actuator adapted to rotate the support member about the second axis to selectively adjust a circumferential position of the first cutting surface.

18. The perforating apparatus of claim 1, wherein the support member comprises a plurality of first cutting surfaces that are circumferentially spaced from each other about the second axis and wherein the support member actuator comprises:

a first end portion connected with the frame; and an opposing second end portion connected with the support member;

wherein the support member actuator is configured to adaptively increase and decrease in length between the first end portion and the second end portion to rotate the support member about the second axis to selectively adjust the circumferential position of the plurality of first cutting surfaces such that one of the plurality of first cutting surfaces is moved out of a contacting relationship with the second cutting surface and another of the plurality of first cutting surfaces is moved into the contacting relationship with the second cutting surface when perforations are not being formed in the substrate.

19. The perforating apparatus of claim 1, wherein the first cutting surface comprises a blade;

wherein the second cutting surface comprises an anvil;

wherein the blade is positioned such that a distal edge of the blade overlaps a distal edge of the anvil by an overlap distance;

wherein the overlap distance is measured between the distal edge of the blade and the distal edge of the anvil in a cross direction that is perpendicular to the machine direction; and wherein the holding device in the first configuration is configured to adjust the overlap distance based on rotation of the housing about the first axis.

20. The perforating apparatus of claim 19, wherein the holding device in the first configuration is configured to adjust the overlap distance such that:

the overlap distance is greater than a first threshold value such that the blade operatively engages the anvil and the substrate is perforated; and the overlap distance is less than a second threshold value such that the substate can advance through a nip where the anvil contacts the blade.

* * * * *